(12) United States Patent
Nishimura et al.

(10) Patent No.: US 10,066,852 B2
(45) Date of Patent: Sep. 4, 2018

(54) WATER HEATER

(71) Applicant: NORITZ CORPORATION, Hyogo (JP)

(72) Inventors: Kazuhiro Nishimura, Kobe (JP); Makoto Hirotsu, Kobe (JP)

(73) Assignee: NORITZ CORPORATION, Hyogo (JP)

( * ) Notice: Subject to any disclaimer, the term of this patent is extended or adjusted under 35 U.S.C. 154(b) by 77 days.

(21) Appl. No.: 15/079,643

(22) Filed: Mar. 24, 2016

(65) Prior Publication Data

US 2016/0313027 A1    Oct. 27, 2016

(30) Foreign Application Priority Data

Apr. 21, 2015  (JP) .................................. 2015-086694

(51) Int. Cl.
*F24H 8/00* (2006.01)
*F24H 9/12* (2006.01)
(Continued)

(52) U.S. Cl.
CPC ............. *F24H 8/00* (2013.01); *F24H 1/165* (2013.01); *F24H 1/445* (2013.01); *F24H 1/46* (2013.01);
(Continued)

(58) Field of Classification Search
CPC ... F24H 8/00; F24H 1/445; F24H 1/46; F24H 1/165; F24H 9/001; F24H 9/128;
(Continued)

(56) References Cited

U.S. PATENT DOCUMENTS

| 4,010,734 A * | 3/1977 | Chayet | .................. | F24D 11/003 |
| | | | | 126/587 |
| 4,898,152 A * | 2/1990 | Kahl | .................. | F24D 17/0021 |
| | | | | 122/381 |

(Continued)

FOREIGN PATENT DOCUMENTS

| GB | 2020794 A | * 11/1979 | ............. F23N 5/247 |
| JP | 2005-207687 A | 8/2005 | |

(Continued)

OTHER PUBLICATIONS

Water Pump Controls, http://inspectapedia.com/water/Water_Pump_Controls.php, Pictures dated 2012.*

*Primary Examiner* — Steven B McAllister
*Assistant Examiner* — Steven Anderson, II
(74) *Attorney, Agent, or Firm* — Studebaker & Brackett PC (57) ABSTRACT

A water heater has a primary heat exchanger having a first heat transfer tube, a secondary heat exchanger having a second heat transfer tube connected with the first heat transfer tube and being located higher than the first heat transfer tube, and an outflow path connected to an outflow-side end portion of the first heat transfer tube. The outflow path has an offset flow path portion including a rising portion which rises upward or obliquely upward from a connecting portion of the outflow path and the outflow-side end portion of the first heat transfer tube or from the vicinity of the connecting portion, the offset flow path portion being offset at a position higher than the outflow-side end portion. When hot water supply is temporally stopped, the water at high temperature in the first heat transfer tube flows into the offset flow path portion, thereby inhibiting such a disadvantage that water having a lower temperature than a target tem- (Continued)

perature is supplied because of a natural convection at the time of restarting hot water supply.

9 Claims, 8 Drawing Sheets

(51) Int. Cl.
  *F24H 9/14* (2006.01)
  *F24H 9/00* (2006.01)
  *F24H 1/16* (2006.01)
  *F24H 1/44* (2006.01)
  *F24H 1/46* (2006.01)
  *F24H 9/20* (2006.01)

(52) U.S. Cl.
  CPC ............. *F24H 9/001* (2013.01); *F24H 9/128* (2013.01); *F24H 9/144* (2013.01); *F24H 9/146* (2013.01); *F24H 9/2035* (2013.01); *Y02B 30/102* (2013.01)

(58) Field of Classification Search
  CPC ........ F24H 9/2035; F24H 9/146; F24H 9/144; Y02B 30/102
  See application file for complete search history.

(56) References Cited

U.S. PATENT DOCUMENTS

| | | | | |
|---|---|---|---|---|
| 2006/0107944 | A1* | 5/2006 | Bourke | F24D 17/0021 126/599 |
| 2011/0155079 | A1* | 6/2011 | Matsunaga | F24H 1/40 122/15.1 |
| 2012/0090341 | A1* | 4/2012 | Hatada | F25B 27/00 62/238.7 |
| 2012/0090560 | A1* | 4/2012 | Iwama | F24H 1/145 122/14.3 |
| 2014/0174382 | A1* | 6/2014 | Oohigashi | F24H 8/00 122/18.4 |
| 2016/0169071 | A1* | 6/2016 | Deivasigamani | F01N 3/043 60/39.5 |

FOREIGN PATENT DOCUMENTS

| | | |
|---|---|---|
| JP | 2007-032935 A | 2/2007 |
| JP | 2013-011409 A | 1/2013 |

* cited by examiner

FIG. 11A outflow of hot water   inflow of water

WATER HEATER

BACKGROUND OF THE INVENTION

Field of the Invention

The present invention relates to a water heater such as a gas water heater.

Description of the Related Art

Figure 11A:
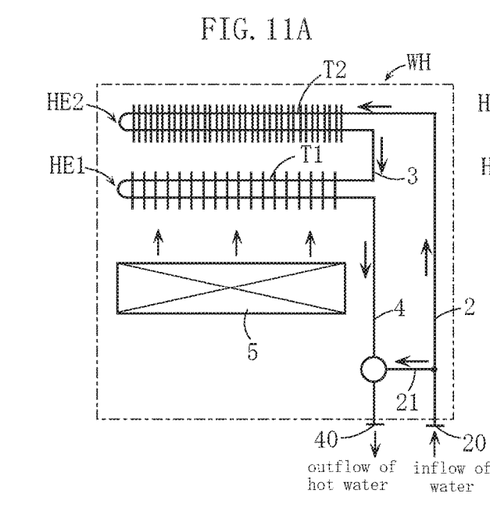
FIG. 11A to FIG. 11C diagrammatically illustrate an embodiment of the conventional art.

Specific example of a water heater is a latent heat recovery type shown in FIG. 11A. In a water heater WH shown in FIG. 11A, water is heated by recovering sensible heat and latent heat from combustion gas generated by a burner 5 using a primary heat exchanger HE1 and a secondary heat exchanger HE2. Water supplied to an inflow port for water 20 passes through an inflow path for water 2, flows to be heated in a second heat transfer tube T2 of the secondary heat exchanger HE2, then passes through an intermediate flow path 3, flows to be heated in a first heat transfer tube T1 of the primary heat exchanger HE1, and passes through an outflow path for hot water 4, thereby reaching an outflow port for hot water 40. The outflow path 4 and the inflow path 2 are connected via a bypass flow path 21 and the temperature of outflowing water is controllable at a target value by controlling the amount of water to be flown into the outflow path 4 through the bypass flow path 21 from the inflow path 2.

Figure 11B:
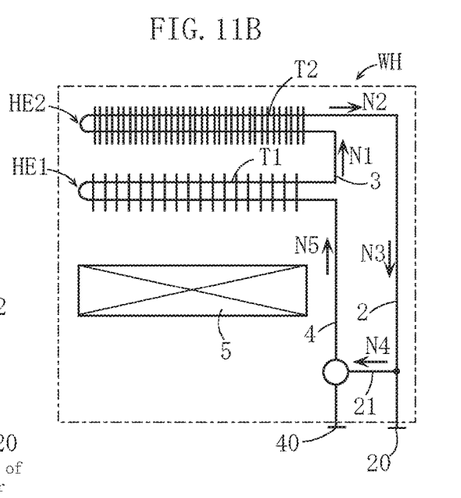

In the water heater WH, when hot water supply is restarted sometime after being stopped, there is a disadvantage such that the temperature of water (the temperature of the water flown from the outflow port 40) temporally becomes lower than a target temperature. Such a disadvantage is caused when a natural convection of water shown with the arrows N1 to N5 in FIG. 11B is generated at the time of stopping hot water supply. Such a natural convection is caused by the following principle. When hot water supply is stopped, the water in the first heat transfer tube T1 passes through the intermediate flow path 3 and goes up toward the second heat transfer tube T2 because the water in the first heat transfer tube T1 has a higher temperature and a smaller specific gravity than the water in the second heat transfer tube T2. Then, the water in the second heat transfer tube T2 flows toward the inflow path 2. When water flows into the inflow path 2, the water which is not heated and has a low temperature in the bypass flow path 21 flows into the outflow path 4. When hot water supply is restarted under such a condition, water which is not heated and at a low temperature and which has flown into the outflow path 4 from the bypass flow path 21 reaches the outflow port 40 and is supplied to a predetermined destination. As a result, there is a worry that the water having a relatively lower temperature than a target temperature is supplied to the destination.

Figure 11C:
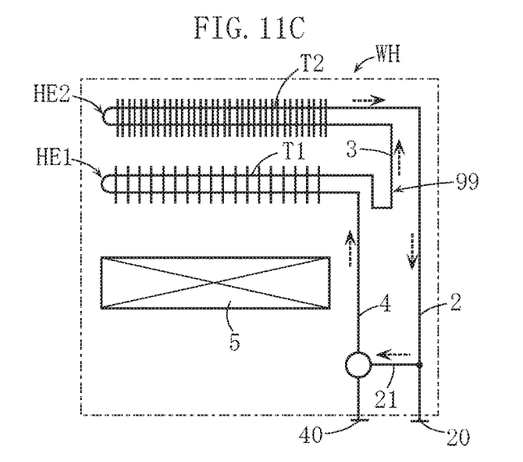

It is desirable that such a disadvantage is appropriately prevented. In the conventional art, a trap flow path 99 is provided for the intermediate flow path 3 connecting the first and the second heat transfer tubes T1, T2 as shown in FIG. 11C (referring to Patent Literatures 1 and 2). In such a case, the trap flow path 99 inhibits the water in the first heat transfer tube T1 from going up toward the second heat transfer tube T2 at the time of stopping hot water supply. Therefore, "natural convection of water" as mentioned above is inhibited.

There is a case that the water in the first heat transfer tube T1 is not adequately prevented from going up toward the second heat transfer tube T2 only by providing the trap flow path 99 for the intermediate flow path 3. The applicant of the present invention has already proposed a first heat transfer tube provided in a single stage in the vertically height direction and in a meandering manner in plan view as disclosed in Patent Literature 3. However, in such a case, it is further difficult to prevent the above-mentioned natural convection. It is because that the temperature of the water in an upper tube is lower than that in a lower tube when the first heat transfer tube T1 is constituted with two tube bodies up and down as shown in FIG. 11A to FIG. 11C, so that the natural convection shown in FIG. 11B is slightly weakened; on the other hand, such a situation does not occur when the first heat transfer tube T1, meandering in plan view, is provided vertically in a single stage as mentioned above.

CITATION LIST

Patent Literature 1: Japanese Unexamined Patent Publication No. 2005-207687
Patent Literature 2: Japanese Unexamined Patent Publication No. 2007-32935
Patent Literature 3: Japanese Unexamined Patent Publication No. 2013-11409

SUMMARY OF THE INVENTION

An object of the present invention is to provide a water heater capable of appropriately inhibiting or preventing the above-mentioned disadvantages.

The present invention proposes the following technical measures for solving the above-mentioned problems.

A water heater provided in one aspect of the present invention has a primary heat exchanger having a first heat transfer tube configured to recover heat from heating gas, and a secondary heat exchanger having a second heat transfer tube configured to further recover heat from heating gas of which heat has been recovered in the primary heat exchanger, the secondary heat transfer tube being connected with the first heat transfer tube and being located higher than the first heat transfer tube. The water heater further has a bypass flow path connecting an inflow path connected with an inflow-side end portion of the second heat transfer tube with an outflow path connected with an outflow-side end portion of the first heat transfer tube. The outflow path has an offset flow path portion including a rising portion which rises upward or obliquely upward from a connecting portion of the outflow path and the outflow-side end portion of the first heat transfer tube or from the vicinity of the connecting portion, and the offset flow path portion is offset at a position higher than the outflow-side end portion.

Preferably, the offset flow path portion further has a horizontal portion connected with an upper end portion of the rising portion and extending substantially in a horizontal direction.

Preferably, the primary heat exchanger has a case into which heating gas is supplied and in which the first heat transfer tube is housed, and the horizontal portion and the rising portion of the offset flow path portion are in a non-contact condition with the case.

Preferably, the primary heat exchanger has a case having a circumferential wall portion in a shape of a frame and an upper flange portion, heating gas being supplied into the circumferential wall portion, the upper flange portion being provided at an upper portion of the circumferential wall portion and mounting the secondary heat exchanger directly or indirectly. The first heat transfer tube is configured in such a manner that a plurality of straight tube bodies supported by the circumferential wall portion are connected via a plurality of connection tube bodies arranged outside of the circumferential wall portion.

Preferably, a space is provided between the plurality of connection tube bodies and the upper flange portion, and the horizontal portion is configured to extend into the space or face the space.

Preferably, the horizontal portion is located under the upper flange portion and is departed from an outer surface of the case in a horizontal direction further than the plurality of connection tube bodies.

Preferably, the primary heat exchanger has a case having a circumferential wall portion in a shape of a frame into which heating gas is supplied, the circumferential wall portion being constituted with a plurality of side wall portions, and the offset flow path portion is configured to wind around at least two side wall portions in a non-contact condition.

Preferably, an end portion of the offset flow path portion and the inflow-side end portion have a pair of pipe connection ports, and the offset flow path portion is configured in such a manner that the pair of pipe connection ports are arranged on the same side of the case in a longitudinal width direction or in a lateral width direction.

Preferably, the water heater in one aspect of the present invention further has a first trap flow path provided in an area, close to the second heat transfer tube, of the inflow path.

Preferably, a lowest portion of the first trap flow path is lower than the outflow-side end portion of the first heat transfer tube.

Preferably, the water heater in the one aspect of the present invention further has a second trap flow path provided for an intermediate flow path connecting the first heat transfer tube and the second heat transfer tube.

Preferably, the first heat transfer tube is configured in such a manner that a plurality of straight tube bodies are arranged with a space in a direction intersecting with an axially longitudinal direction and are consecutively connected in a meandering manner via a plurality of connection tube bodies. The primary heat exchanger has a case into which heating gas is supplied and the heat transfer tube in a meandering manner is provided in a single stage in a vertical height direction in the case.

Preferably, the primary heat exchanger has a case into which heating gas is supplied and in which the first heat transfer tube is housed, and a third heat transfer tube arranged in side-by-side to the first heat transfer tube in the case. The secondary heat exchanger has an additional case into which heating gas of which heat has been recovered in the first heat transfer tube and the third heat transfer tube is supplied and in which the second heat transfer tube is housed, and has a fourth heat transfer tube arranged in side-by-side to the second heat transfer tube in the additional case.

Other characteristics and advantages of the present invention will be apparent in the following detailed description of the preferred embodiments referring to the attached drawings.

DETAILED DESCRIPTION OF THE PREFERRED EMBODIMENT

Preferred embodiments of the present invention are explained below with reference to the accompanying drawings.

In the explanation to be mentioned below, the elements same as or similar to those in the conventional art shown in FIG. 11A to FIG. 11C are allotted with the same reference numerals for easy understanding.

FIG. 1 to FIG. 5 show one embodiment of a water heater to which the present invention is applied.

Figure 1:
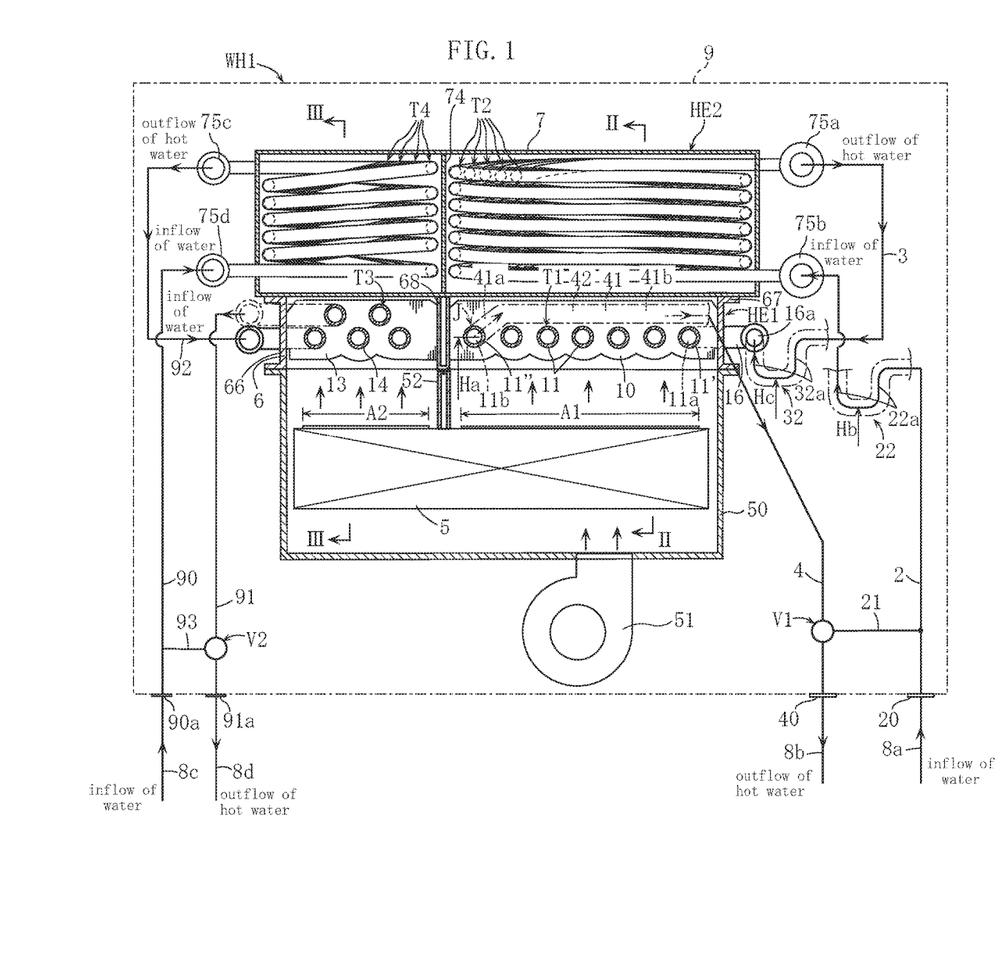
FIG. 1 is a diagrammatic front sectional view showing one embodiment of a water heater of the present invention.

In FIG. 1, a water heater WH1 in the embodiment of the present invention has a similar basic structure to that disclosed in Patent Literature 3 and has a burner 5, the primary heat exchanger HE1, the secondary heat exchanger HE2, and an exterior case 9 surrounding them.

The water heater WH1 is capable of separately supplying hot water in two lines, namely a hot water supply system, and a hot water heating system (or a reheating system for bath). The primary heat exchanger HE1 and the secondary heat exchanger HE2 have two water paths in one case, respectively. In the primary heat exchanger HE1, a first and a third heat transfer tubes T1, T3 to be mentioned later are housed in a case 6. In the secondary heat exchanger HE2, a second and a fourth heat transfer tubes T2, T4 to be mentioned later are housed in a case 7.

The bottom portion or the side portion of the exterior case 9 is provided with inflow ports for water 20, 90*a* to which external inflow tubes of water 8*a*, 8*c* are connected and with outflow ports for hot water 40, 91*a* to which external outflow tubes of water 8*b*, 8*d* are connected. On a hot water supply side, the water supplied to the inflow port for water 20 is supplied to a header 75*b* of the secondary heat exchanger HE2 through the inflow path for water 2, thereby circulating in the second heat transfer tube T2. Then, the water is supplied to the primary heat exchanger HE1 through a header 75*a* of the secondary heat exchanger HE2 and the intermediate flow path 3, thereby circulating in the first heat transfer tube T1. After passing through the first heat transfer tube T1, the water reaches the outflow port for hot water 40 through the outflow path for hot water 4. The inflow path 2 and the outflow path 4 are connected via the bypass flow path 21 and a mixing valve V1. The mixing valve V1 is capable of mixing the non-heated water flown into the bypass flow path 21 from the inflow path 2 and the water in the outflow path 4 at a desirable rate. By mixing the waters, the temperature of the water reaching the outflow port 40 is able to be controlled at a target water temperature. The water reaching the outflow port 40 is supplied to a kitchen and a lavatory.

In this embodiment, for stabilizing water temperature at the time of restarting hot water supply, an offset flow path portion 41 is provided for the outflow path 4, and a first trap flow path 22 and a second trap flow path 32 are provided for the inflow path 2 and the intermediate flow path 3. The details are explained later.

On a hot water heating side (or on a bath reheating side), the water supplied to the inflow port 90a is supplied to a header 75d of the secondary heat exchanger HE2 through the inflow path for water 90, flows in the fourth heat transfer tube T4, and then is sent to the third heat transfer tube T3 of the primary heat exchanger HE1 through a header 75c and the intermediate flow path 92. Thereafter, the water reaches the outflow port 91a through the outflow path for hot water 91. The outflow path 91 and the inflow path 90 are connected via a bypass flow path 93 and a mixing valve V2 like the hot water supply side. The water reaching the outflow port 91a is sent to a heating terminal device (or a bathtub), not shown. In case of hot water heating (or a bath reheating), water temperature is allowed to be unstable and to be slightly changed at the beginning of hot water supply, unlike a hot water supply system. Therefore, the hot water heating side (on the side of the third and the fourth heat transfer tubes T3, T4) is not provided with means corresponding to the offset flow path portion 41, the first and the second trap flow paths 22, 32, which are provided for the hot water supply side (on the side of the first and the second heat transfer tubes T1, T2). However, such means can be provided for the hot water heating side, different from the embodiment of the present invention.

The burner 5, for example a gas burner, burns fuel gas utilizing combustion air sent upwardly from a fan 51 into a burner case 50. The burner 5 has a first combustion area A1 and a second combustion area A2 in which combustion drive control is separately executed. The upper area is separated by a partition member 52 and combustion gas generated in the first and the second combustion areas A1, A2 proceeds separately toward the first and the third heat transfer tubes T1, T3.

The primary heat exchanger HE1 recovers sensible heat from the combustion gas and is housed in the case 6 mounted on the burner case 50 in such a manner that the first and the third heat transfer tubes T1, T3 are arranged in side-by-side with a partition member 68 interposed therebetween. The case 6 has a circumferential wall portion 66 in the shape of a rectangular frame of which upper face and lower face are opened, and has an upper flange portion 67 provided at an upper portion of the circumferential wall portion 66. The upper flange portion 67 is provided so as to be assembled with the secondary heat exchanger HE2. The combustion gas is supplied to the circumferential wall portion 66 from downward.

Figure 4:
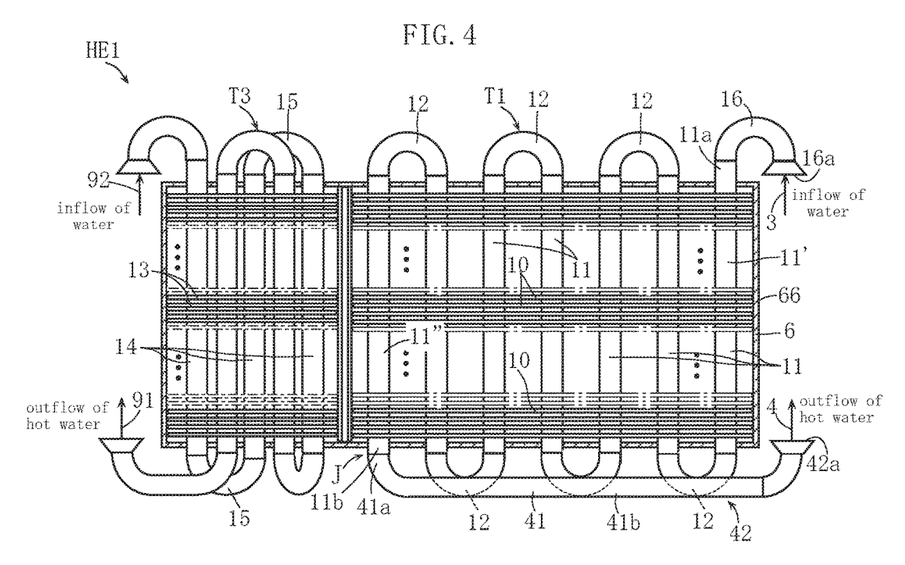
FIG. 4 shows a plane section of a primary heat exchanger of the water heater shown in FIG. 1.
Figure 5:
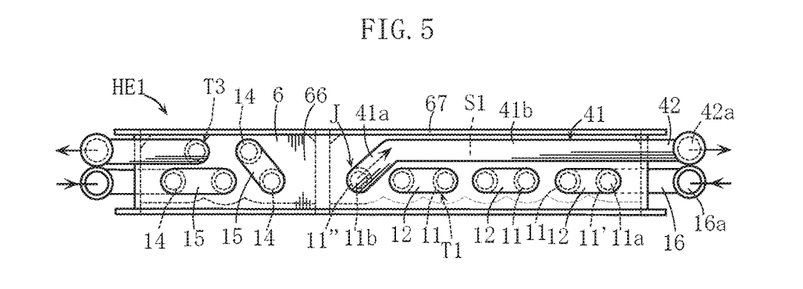
FIG. 5 is a front view of the primary heat exchanger shown in FIG. 4.

The first and the third heat transfer tubes T1, T3 are finned tubes made of copper and provided with a plurality of fins 10, 13. As shown in FIG. 4 and FIG. 5, the first heat transfer tube T1 is in a meandering manner in plan view such that a plurality of straight tube bodies 11 arranged in the lateral width direction of the case 6 are consequently connected via connection tube bodies 12 substantially in the shape of a letter U and are arranged in a single stage in the vertical height direction. The third heat transfer tube T3 is configured, like the first heat transfer tube T1, in such a manner that a plurality of straight tube bodies 14 are consequently connected via connection tube bodies 15; however the straight tube bodies 14 are arranged in, for example, two stages in the vertical height direction.

Figure 2:
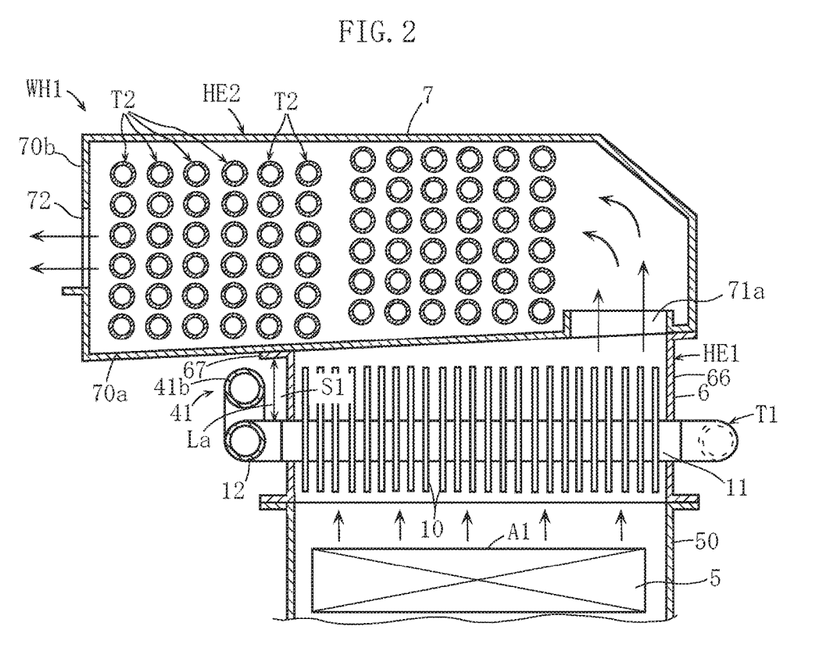
FIG. 2 is a sectional view along the line II to II in FIG. 1.
Figure 3:
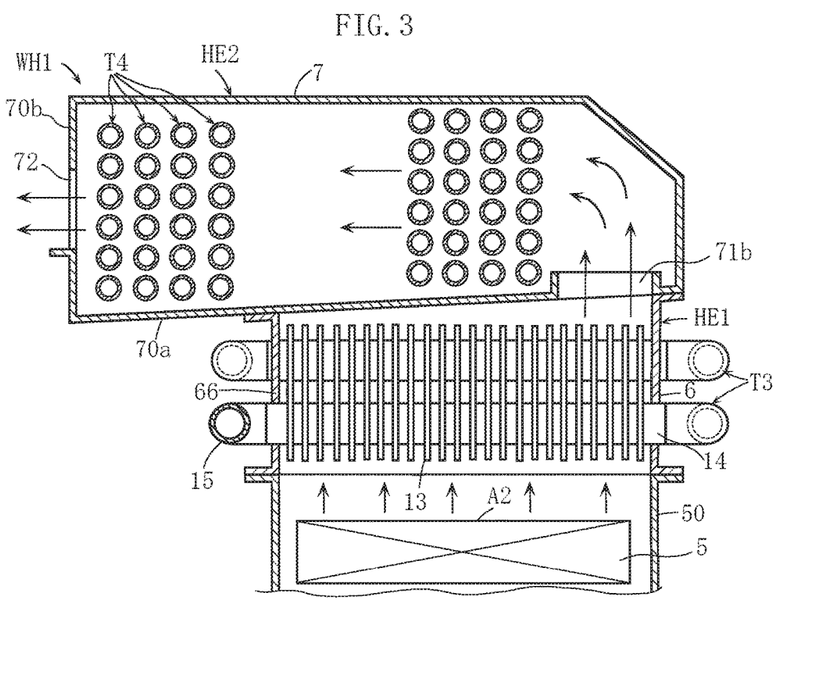
FIG. 3 is a sectional view along the line III to III in FIG. 1.

In FIG. 1, the secondary heat exchanger HE2 recovers latent heat from the combustion gas passing through the primary heat exchanger HE1. In the case 7 mounted on the primary heat exchanger HE1, a plurality of second and the fourth heat transfer tubes T2, T4 are arranged in side-by-side with a partition board 74 interposed therebetween. The second and the fourth heat transfer tubes T2, T4 are, for example, helical tube bodies with different sizes and are overlapped in a substantially concentric manner, like the heat transfer tube of the secondary heat exchanger in Patent Literature 3. As shown in FIG. 2, the combustion gas upwardly passing through the position where the first heat transfer tube T1 is provided flows into the case 7 through an air supply port 71a of a bottom wall portion 70a of the case 7, works on the second heat transfer tubes T2, and reaches a discharge port 72 of a front wall portion 70b. As shown in FIG. 3, the combustion gas upwardly passing through the position where the third heat transfer tube T3 is provided flows into the case 7 through an air supply port 71b of the bottom wall portion 70a of the case 7, works on the fourth heat transfer tubes T4, and reaches the discharge port 72.

In FIG. 1 and FIG. 4, one end portion of a straight tube body 11', located close to an end of the case 6 in the width direction, of the first heat transfer tube T1 is an inflow-side end portion 11a. The inflow-side end portion 11a is connected with an auxiliary tube 16, substantially in the shape of a letter U, having a tube connection port 16a in order to facilitate pipe connection with the header 75a of the secondary heat exchanger HE2. A series of water flow path from the header 75a to the inflow-side end portion 11a is the above-mentioned intermediate flow path 3. One end portion of a straight tube body 11", close to the center of the case 6, of the first heat transfer tube T1 is an outflow-side end portion 11b. The outflow-side end portion 11b is connected with an auxiliary tube 42 having a pipe connection port 42a (omitted in FIG. 1). A series of water flow path from the outflow-side end portion 11b to the outflow port 40 is the above-mentioned outflow path 4.

As shown in FIG. 1 and FIG. 5, the offset flow path portion 41 is a part of the outflow path 4 and is constituted using the auxiliary tube 42. Specifically, the offset flow path portion 41 has a rising portion 41a rising obliquely upward (or upward) from a connecting portion J of the outflow-side end portion 11b and the auxiliary tube 42 or from the vicinity of the connecting portion J, and has a horizontal portion 41b connected to the upper end portion of the rising portion 41a so as to extend substantially in the horizontal direction. The offset flow path portion 41 is offset at a higher position than the outflow-side end portion 11b, and is preferably in a non-contact condition with the case 6.

The first heat transfer tube T1 is at substantially the same height as the lower straight tube body 14 of the third heat transfer tube T3. A space S1 is formed between the connection tube bodies 12 of the first heat transfer tube T1 and the upper flange portion 67 of the case 6 as shown in FIG. 2, the vertical width La of the space S1 being larger than the outer diameter of the offset flow path portion 41. The horizontal portion 41b of the offset flow path portion 41 is provided above the connection tube bodies 12 so as to extend into or face the space S1. Since the offset flow path portion 41 is thus provided in the space S1, originally having no use, the offset flow path portion 41 is provided without enlarging the primary heat exchanger HE1.

In FIG. 1, the first trap flow path 22 is provided for part of the inflow path 2 in the vicinity of the header 75b of the secondary heat exchanger HE2. The first trap flow path 22, like a commonly used U-shaped trap, has a pair of falling flow paths 22a extending downward from both sides of the flow path 22 and the lower portions of the falling low paths 22a are connected. Preferably, height Hb of the lowest portion of the first trap flow path 22 is smaller than height Ha of the outflow-side end portion 11b.

The intermediate flow path 3 is provided with the second trap flow path 32. The second trap flow path 32, shaped similar to the first trap flow path 22, has a pair of falling flow paths 32a extending downward from both sides of the flow path 32 and the lower portions of the falling flow paths 32a are connected. Preferably, height Hc of the lowest portion of the second trap flow path 32 is smaller than height Ha of the outflow-side end portion 11b. The second trap flow path 32 is provided for part of the intermediate flow path 3 closer to the outflow-side end portion 11b.

Next, operational effect of the above-mentioned water heater WH1 is explained.

As mentioned above, when hot water supply is executed such that: the water flown into the inflow path 2 from the inflow port 20 flows into the second heat transfer tube T2, the intermediate flow path 3, the first heat transfer tube T1 and the outflow path 4; combustion gas generated in the first combustion area A1 in the burner 5 works on the first and the second heat transfer tubes T1, T2 in order. When such hot water supply is temporally stopped, the water temperature in the first heat transfer tube T1 becomes higher than that in the second heat transfer tube T2 and the specific gravity of the water in the first heat transfer tube T1 becomes smaller than that in the second heat transfer tube T2. Then, the water in the first heat transfer tube T1 positively flows into the offset flow path portion 41 from the outflow-side end portion 11b. The temperature distribution of the water in the first heat transfer tube T1 on the outflow side is higher than that on the inflow side, so that the amount of the water flowing from the outflow-side end portion 11b to the offset flow path portion 41 increases. The offset flow path portion 41 is constituted such that the horizontal portion 41b is connected with the rising portion 41a, thereby enlarging the volume of the offset flow path portion 41 and enabling smooth flow of a large amount of water, going up in the rising portion 41a, into the horizontal portion 41b. As a result, a large amount of water is able to positively flow from the outflow-side end portion 11b to the offset flow path portion 41.

When the water in the first heat transfer tube T1 flows into the offset flow path portion 41 as mentioned above, the amount of the water flown from the first heat transfer tube T1 to the second heat transfer tube T2 via the intermediate flow path 3 reduces by the amount of water flowing from the first heat transfer tube T1 to the offset flow path portion 41. As a result, the natural convection of water as shown in FIG. 11B is inhibited and water, which is not heated and is at low temperature, in the bypass flow path 21 is inhibited from flowing into the outflow path 4. Such a phenomenon of outflow of water at relatively lower temperature than a target water temperature from the outflow port 40 is suitably inhibited and effect of stabilizing the water temperature is obtained.

Since the inflow path 2 has the first trap flow path 22, when the water in the first heat transfer tube T1 tries to flow into the second heat transfer tube T2 through the intermediate flow path 3 at the time of stopping hot water supply as mentioned above, such a flow is inhibited by the first trap flow path 22. In addition, the second trap flow path 32 provided for the intermediate flow path 3 exerts similar operational effect of inhibiting the above-mentioned water flow. Therefore, the natural convection shown in FIG. 11B is thoroughly prevented and hot water supply temperature at the time of restarting hot water supply is more stabled.

The offset flow path portion 41, in a non-contact condition with the case 6, is not excessively heated by the conductive heat generated from the case 6. When the offset flow path portion 41 is excessively heated, scale is likely to be generated therein; however, such a worry is able to be solved in the present embodiment.

FIG. 6 to FIG. 10A and FIG. 10B show another embodiment of the present invention. In these figures, the elements same as or similar to those in the precedent embodiment are allotted with the same reference numerals and the redundant explanation is omitted.

Figure 6:
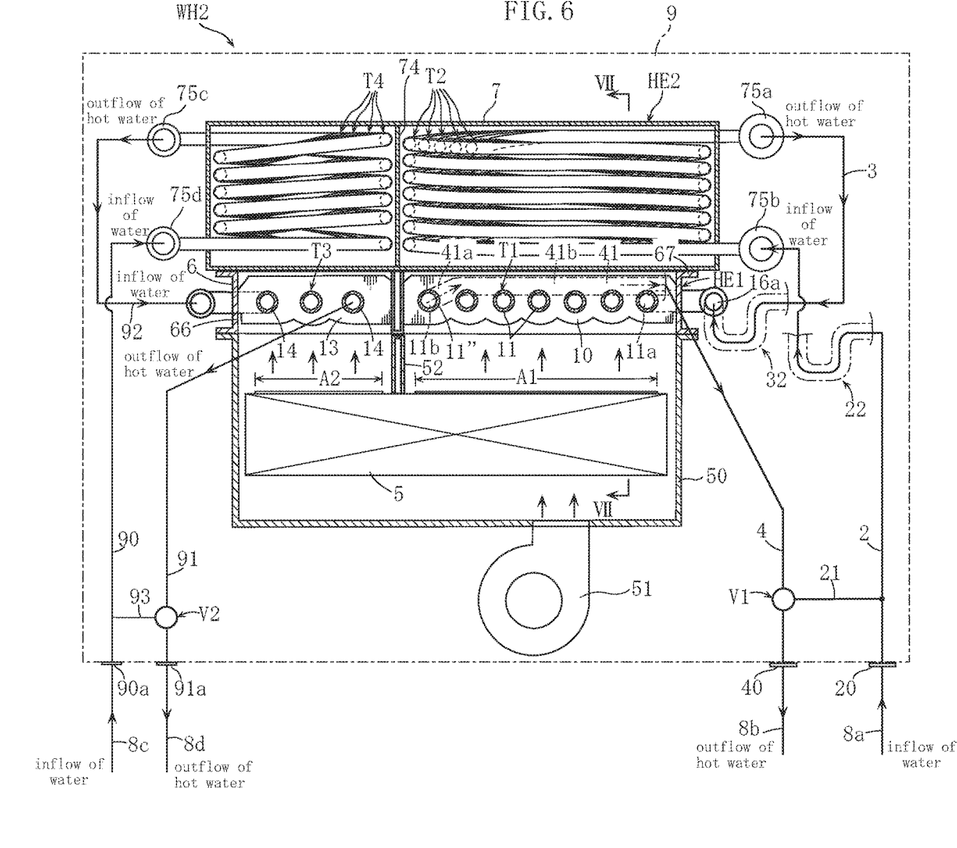
FIG. 6 is a diagrammatic front sectional view showing another embodiment of the water heater of the present invention.
Figure 7:
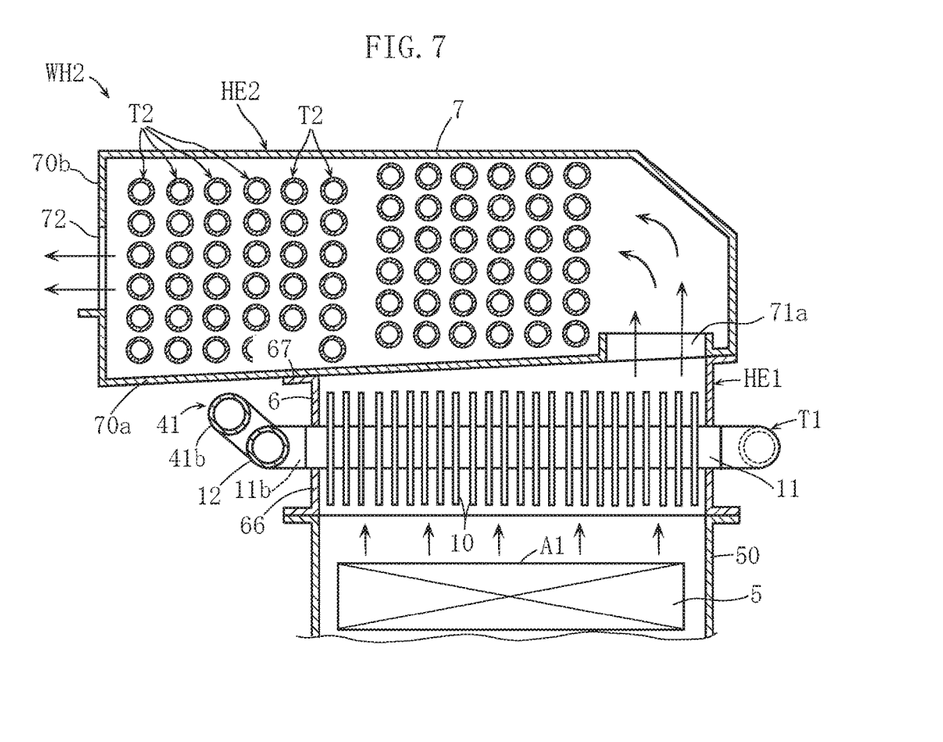
FIG. 7 is a sectional view along the line VII to VII in FIG. 6.

In a water heater WH2 shown in FIG. 6, a plurality of straight tube bodies 14 of the third heat transfer tube T3 are provided in a single stage in the vertical height direction, thereby reducing the entire vertical height of the case 6 of the primary heat exchanger HE1. The horizontal portion 41b of the offset flow path portion 41 is provided below the upper flange portion 67 of the case 6 and at a position departing from the outer face of the case 6 in the horizontal direction further than the connection tube bodies 12, namely at a position closer to the left in the figure, as shown in FIG. 7. The horizontal portion 41b is of course higher than the outflow-side end portion 11b of the first heat transfer tube T1. In this embodiment, the horizontal portion 41b and the outflow-side end portion 11b are partially overlapped in the vertical height direction. Such a positional relation is acceptable in the present invention. It is enough that the center of at least a part of the offset flow path portion 41 is higher than the center of the outflow-side end portion 11b.

Figure 8:
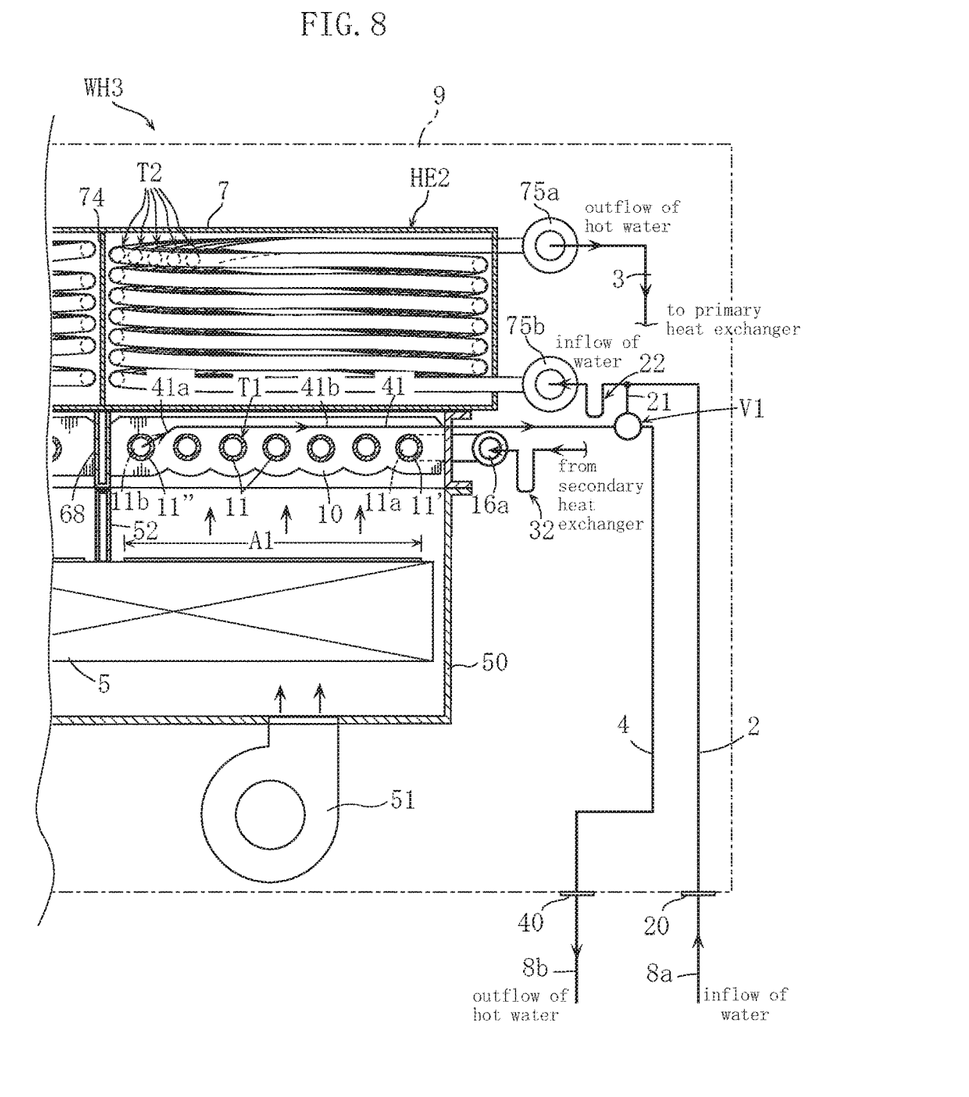
FIG. 8 is a diagrammatic front sectional view showing a major part of another embodiment of the water heater of the present invention.

In a water heater WH3 shown in FIG. 8, the horizontal portion 41b of the offset flow path portion 41 is connected with the bypass flow path 21 for inflow of the water from the inflow path 2 and the mixing valve V1 is further provided.

In this embodiment, when the water in the first heat transfer tube T1 positively flows into the offset flow path portion 41 at the time of stopping hot water supply, there is such effect that the non-heated water in the inflow path 2 has difficulty to flow into the offset flow path portion 41 through the bypass flow path 21. Therefore, the natural convection of water as shown in FIG. 11B is more thoroughly prevented.

Figure 9:
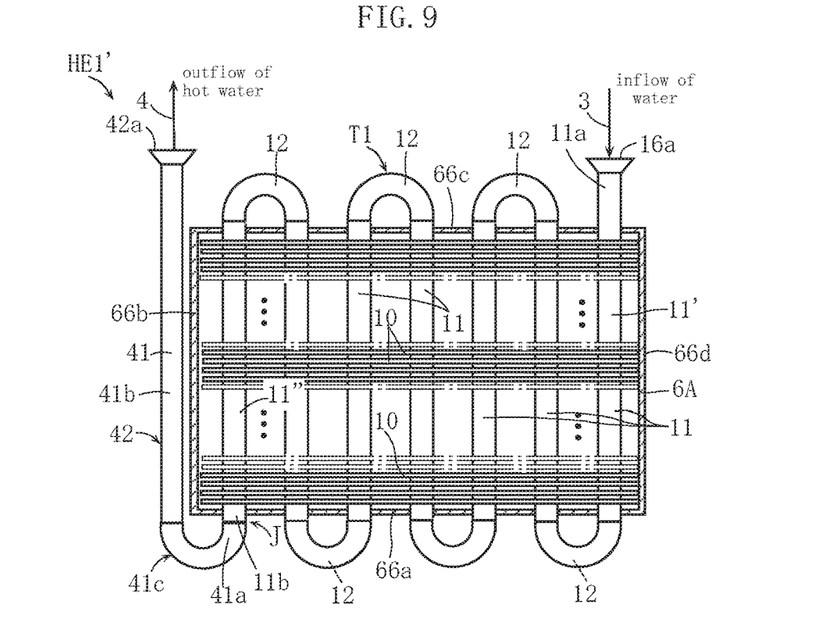
FIG. 9 shows a plane section of another embodiment of the present invention.
Figure 10A:
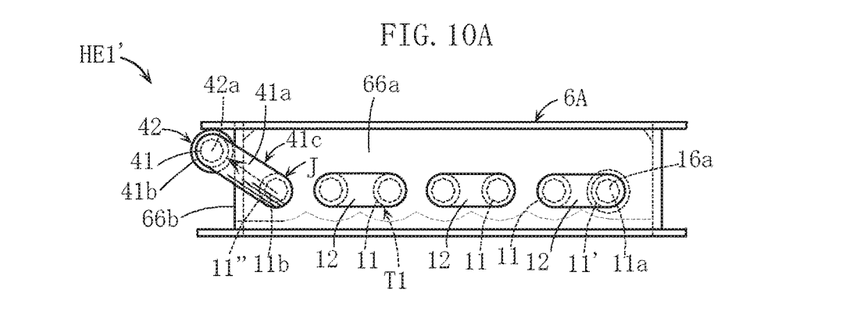
FIG. 10A is a front view of the embodiment in FIG. 9
Figure 10B:
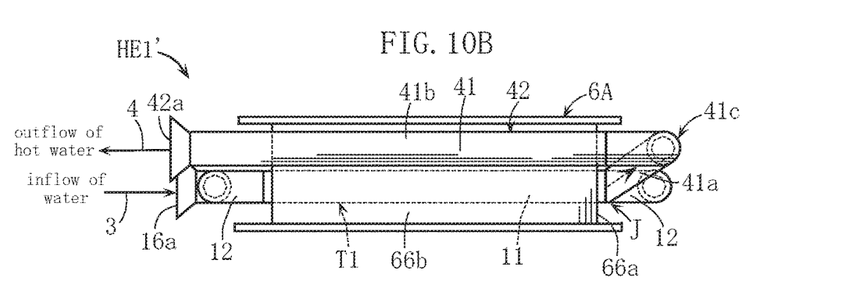
FIG. 10B shows its left side view.

A primary heat exchanger HE1' shown in FIG. 9, FIG. 10A and FIG. 10B is different from the heat exchanger HE1 in the above-mentioned embodiment in that the third heat transfer tube T3 is not provided and only the first heat transfer tube T1 is provided for hot water supply as the heat transfer tube. Therefore, the water heater constituted with the primary heat exchanger HE1' is used for hot water supply, and a burner and a secondary heat exchanger are provided corresponding to the primary heat exchanger HE1'. The circumferential wall portion 66 of a case 6A is constituted with first to fourth side wall portions 66a-66d.

The offset flow path portion 41 of the primary heat exchanger HE1' has a bent portion 41c curved or crooked seen in plan view. The bent portion 41c constitutes the rising portion 41a. Thus, the offset flow path portion 41 is located beside a part of the first side wall portion 66a of the case 6A and the second side wall portion 66b and winds around them in a non-contact condition. The pipe connection port 42a at the terminal end of the offset flow path portion 41 and the pipe connection port 16a of the inflow-side end portion 11a are provided on the same face of the case 6A in the longitudinal width direction or in the lateral width direction of the case 6A.

In this embodiment, the entire length of the offset flow path portion 41 is preferably increased and the volume thereof is also increased. Therefore, such an embodiment is suitable for positively flowing a lot of water in the offset flow path portion 41. The offset flow path portion 41 is in a non-contact condition with the first and the second side wall portions 66a, 66b of the case 6A, so that the offset flow path portion 41 is not excessively heated by the conductive heat generated from the case 6A. As mentioned above, when the offset flow path portion 41 is excessively heated, scale is easily generated therein. However, such a worry is solved in this embodiment. The offset flow path portion 41 is moderately close to the case 6A, thereby effectively heating water using the heat generated from the case 6A. A pair of pipe connection ports 42a, 16a are provided on the same side of the case 6A, thereby facilitating connection of the pipe members constituting the outflow path 4 and the intermediate flow path 3.

The present invention is not limited to the above-mentioned embodiments. The specific configuration of the members of the water heater of the present invention is freely designed within the intended scope of the present invention.

The offset flow path portion in the present invention is preferably constituted in such a manner that the outflow path is provided with the rising portion rising upward or obliquely upward from the connecting portion of the outflow path and the outflow-side end portion of the first heat transfer tube or from the vicinity of the connecting portion, and that a part of the outflow path is offset at a position higher than the above-mentioned outflow-side end portion. The connecting portion of the outflow path and the outflow-side end portion of the first heat transfer tube is a connecting portion in which the piping members constituting the outflow path and the outflow-side end portion of the first heat transfer tube are physically connected by means of welding or brazing. However, the connecting portion is not limited. For example, when a tube constituting the first heat transfer tube extends long from the inside of the case to the outside thereof and the extending portion actually fulfills a role of the outflow path, the boundary area of part of the tube being actually the outflow path and part of the tube being actually the heat transfer tube is the connecting portion of the outflow path and the outflow-side end portion of the first heat transfer tube in the present invention. The offset flow path portion is not limited to have the horizontal portion. The offset flow path portion can be provided with a slowly upward slant portion, or with a downward slant portion after the horizontal portion or the slant portion.

The primary heat exchanger is not limited such that a plurality of straight tube bodies are provided in a single stage in the vertical height direction and the primary heat exchanger can be constituted in such a manner that a plurality of straight tube bodies are provided in several stages. The secondary heat exchanger is only required to recover heat from heating gas which has passed through the primary heat exchanger. In place of a helical heat transfer tube, a heat transfer tube in a meandering manner, in a straight manner or in another manner can be used. Heating gas can be generated by an oil burner instead of a gas burner, or can be exhaust gas at high temperature discharged from a power generation part of a cogeneration system.

The invention claimed is:

1. A water heater comprising:
    a primary heat exchanger having a first heat transfer tube configured to recover heat from heating gas;
    a secondary heat exchanger having a second heat transfer tube configured to further recover heat from heating gas of which heat has been recovered in the primary heat exchanger, the secondary heat transfer tube being connected with the first heat transfer tube and being located higher than the first heat transfer tube;
    a bypass flow path connecting an inflow path connected with an inflow-side end portion of the second heat transfer tube and an outflow path connected with an outflow-side end portion of the first heat transfer tube;
    the outflow path having an offset flow path portion including a rising portion which rises upward or obliquely upward directly or indirectly from a connecting portion of the outflow path with the outflow-side end portion of the first heat transfer tube, the offset flow path portion being offset at a position higher than the outflow-side end portion;
    a first trap flow path provided in an area of the inflow path, wherein a lowest portion of the first trap flow path is lower than the outflow-side end portion of the first heat transfer tube; and
    a second trap flow path provided for an intermediate flow path connecting the first heat transfer tube and the second heat transfer tube,
    wherein the inflow path extends downward from the secondary heat exchanger,
    wherein the outflow path extends downward from the primary heat exchanger except for the offset flow path portion,
    wherein the offset flow path portion further comprises a horizontal portion connected with an upper end portion of the rising portion and extending in a horizontal direction, and
    wherein the offset flow path portion does not extend downward.

2. The water heater according to claim 1,
    wherein the primary heat exchanger comprises a case into which heating gas is supplied and in which the first heat transfer tube is housed, and
    wherein the horizontal portion and the rising portion of the offset flow path portion are in a non-contact condition with the case.

3. The water heater according to claim 1,
    wherein the primary heat exchanger comprises a case having a circumferential wall portion into which heating gas is supplied, the circumferential wall portion provided in a shape of a frame and an upper flange portion, the upper flange portion being provided at an upper portion of the circumferential wall portion and mounting the secondary heat exchanger directly or indirectly,
    wherein the first heat transfer tube is configured in such a manner that a plurality of straight tube bodies supported by the circumferential wall portion are connected via a plurality of connection tube bodies arranged outside of the circumferential wall portion,
    wherein a space is provided between the plurality of connection tube bodies and the upper flange portion, and
    wherein the horizontal portion is configured to extend into the space or face the space.

4. The water heater according to claim 1,
    wherein the primary heat exchanger comprises a case having a circumferential wall portion into which heating gas is supplied, the circumferential wall portion provided in a shape of a frame and an upper flange portion, the upper flange portion being provided at an upper portion of the circumferential wall portion and mounting the secondary heat exchanger directly or indirectly, wherein the first heat transfer tube is configured in such a manner that a plurality of straight tube bodies supported by the circumferential wall portion are connected via a plurality of connection tube bodies arranged outside of the circumferential wall portion, and wherein the horizontal portion is located under the upper flange portion and is departed from an outer surface of the case in a horizontal direction further than the plurality of connection tube bodies.

5. The water heater according to claim 1, wherein the primary heat exchanger comprises a case having a circumferential wall portion in a shape of a frame into which heating gas is supplied, the circumferential wall portion being constituted with a plurality of side wall portions, and wherein the offset flow path portion is configured to wind around at least two side wall portions in a non-contact condition.

6. The water heater according to claim 5, wherein an end portion of the offset flow path portion and the inflow-side end portion have a pair of pipe connection ports, and wherein the offset flow path portion is configured in such a manner that the pair of pipe connection ports are provided on the same side of the case in a longitudinal width direction or in a lateral width direction.

7. The water heater according to claim 1, wherein the primary heat exchanger comprises a case having a circumferential wall portion in a shape of a frame into which heating gas is supplied, the circumferential wall portion being constituted with a plurality of side wall portions, and wherein an end portion of the offset flow path portion and the inflow-side end portion have a pair of pipe connection ports, and the pair of pipe connection ports are provided on the same side of the case in a longitudinal width direction or in a lateral width direction.

8. The water heater according to claim 1, wherein the first heat transfer tube is configured in such a manner that a plurality of straight tube bodies are arranged with a space in a direction intersecting with an axially longitudinal direction and are consecutively connected in a meandering manner via a plurality of connection tube bodies, and wherein the primary heat exchanger comprises a case into which heating gas is supplied and the heat transfer tube in a meandering manner is provided in a single stage in a vertical height direction in the case.

9. The water heater according to claim 1, wherein the primary heat exchanger comprises a case into which heating gas is supplied and in which the first heat transfer tube is housed, and a third heat transfer tube arranged in side-by-side to the first heat transfer tube in the case, and wherein the secondary heat exchanger comprises an additional case into which heating gas of which heat has been recovered in the first heat transfer tube and the third heat transfer tube is supplied and in which the second heat transfer tube is housed, and comprises a fourth heat transfer tube arranged in side-by-side to the second heat transfer tube in the additional case.

* * * * *